3,177,234
NICKEL WERNER COMPLEXES OF ALPHA-ARYLALKYLAMINES
Pierre Marie Joseph Ghislain de Radzitzky d'Ostrowick and Jacques Daniel Victor Hanotier, Brussels, Belgium, assignors to Labofina, Brussels, Belgium
No Drawing. Filed May 22, 1963, Ser. No. 282,231
Claims priority, application Great Britain, May 31, 1962, 21,098/62
26 Claims. (Cl. 260—439)

This application is a continuation-in-part of application S.N. 183,318, filed February 26, 1962, now forfeited, which is a continuation-in-part of application S.N. 855,957, filed November 30, 1959, now abandoned, the latter application having claimed priority dates of December 1, 1958, for British application 38,654 and October 7, 1959, for British application 33,987.

The present invention relates to new chemical complexes and more particularly to chemical complexes which are only slightly soluble or insoluble in water at room temperature, these complexes being of the "Werner complex" type.

It is an object of the present invention to provide new chemical complexes of the Werner type.

It is another object of the present invention to provide new chemical complexes which can be used for the refining or the resolution of very closely related organic compounds into their individual components.

It is also an object of the present invention to provide for the production of the new chemical complexes of this invention.

Other aspects and advantages of the present invention will be apparent from a further reading of the specification and of the appended claims.

For the purpose of simplicity the novel compounds of this invention will be described in two sections, the first section being directed to nickel complexes of unsubstituted and monosubstituted phenylalkylamines, and the second section being directed to nickel complexes of polysubstituted phenylalkylamines.

UNSUBSTITUTED AND MONOSUBSTITUTED PHENYLAKYLAMINES

According to the present invention, there is provided a Werner complex of the general formula $Ni(SCN)_2X_n$ wherein $n$ is either 2 or 4, X is an arylalkylamine of general formula

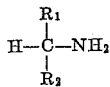

in which $R_1$ is either hydrogen or a primary alkyl group, $R_2$ is an hydrocarbon radical having one benzenic ring, said benzenic nucleus bearing no more than one alkyl side chain and being directly linked to the carbon atom bearing the amino group, at least one of the radicals $R_1$ and $R_2$ having not more than 3 alkyl carbon atoms and the total number of carbon atoms of the amine being not below 8.

An alkyl carbon atom is defined as a carbon atom in an alkyl chain.

Preferably the group $R_1$ will have no more than 9 carbon atoms and the group $R_2$ no more than 15 carbon atoms.

Even more preferably the group $R_1$ will have no more than 3 carbon atoms and $R_2$ no more than 9 carbon atoms.

When the benzenic ring of $R_2$ is substituted with an alkyl chain this substitution is preferably in the paraposition with respect to the carbon atom bearing the amino group.

Specific examples of such amines are given hereinafter. This list is of course not limitative, being given for the purpose of illustration only.

p-Methylbenzylamine
$$p\text{-}CH_3\text{-}C_6H_4\text{-}CH_2\text{-}NH_2$$

p-Hexylbenzylamine
$$p\text{-}C_6H_{13}\text{-}C_6H_4\text{-}CH_2\text{-}NH_2$$

α-Phenylethylamine
$$C_6H_5\text{-}\underset{\underset{NH_2}{|}}{CH}\text{-}CH_3$$

α-Phenylpropylamine
$$C_6H_5\text{-}\underset{\underset{NH_2}{|}}{CH}\text{-}C_2H_5$$

α-Phenylbutylamine
$$C_6H_5\text{-}\underset{\underset{NH_2}{|}}{CH}\text{-}C_3H_7$$

α-Phenylamylamine
$$C_6H_5\text{-}\underset{\underset{NH_2}{|}}{CH}\text{-}C_4H_9$$

α-Phenylisoamylamine
$$C_6H_5\text{-}\underset{\underset{NH_2}{|}}{CH}\text{-}CH_2\text{-}CH(CH_3)_2$$

α-Phenylhexylamine
$$C_6H_5\text{-}\underset{\underset{NH_2}{|}}{CH}\text{-}C_5H_{11}$$

α-Phenylisohexylamine
$$C_6H_5\text{-}\underset{\underset{NH_2}{|}}{CH}\text{-}(CH_2)_2\text{-}CH(CH_3)_2$$

α-Phenylheptylamine
$$C_6H_5\text{-}\underset{\underset{NH_2}{|}}{CH}\text{-}C_6H_{13}$$

α-Phenylnonylamine
$$C_6H_5\text{-}\underset{\underset{NH_2}{|}}{CH}\text{-}C_8H_{17}$$

α-Phenyldecylamine
$$C_6H_5\text{-}\underset{\underset{NH_2}{|}}{CH}\text{-}C_9H_{19}$$

α-Phenyloctadecylamine
$$C_6H_5\text{-}\underset{\underset{NH_2}{|}}{CH}\text{-}C_{17}H_{35}$$

α-(o-Tolyl)ethylamine
$$o\text{-}CH_3\text{-}C_6H_4\text{-}\underset{\underset{NH_2}{|}}{CH}\text{-}CH_3$$

α-(m-Tolyl)ethylamine
$$m\text{-}CH_3\text{-}C_6H_4\text{-}\underset{\underset{NH_2}{|}}{CH}\text{-}CH_3$$

α-(p-Tolyl)ethylamine

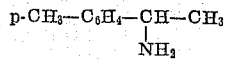

α-(p-Ethylphenyl)ethylamine

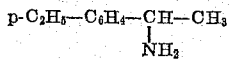

α-(p-Cumyl)ethylamine

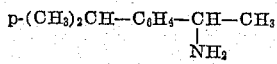

α-(p-Ter-butylphenyl)ethylamine

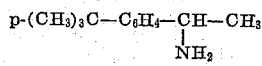

α-(p-Hexylphenyl)ethylamine

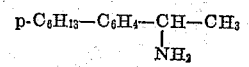

α-(p-Nonylphenyl)ethylamine

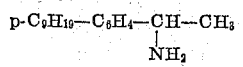

α-(o-Tolyl)propylamine

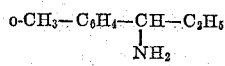

α-(p-Tolyl)butylamine

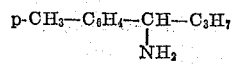

α-(p-Cumyl)butylamine

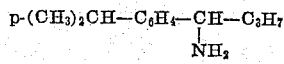

α-(p-Tolyl)heptylamine

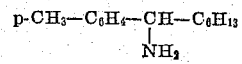

α-(p-Propylphenyl)decylamine

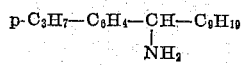

α-(p-Nonylphenyl)butylamine

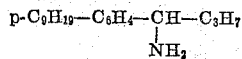

All of the hereinabove described amines have no, or only a slight ammoniacal odor. They thus differ markedly from heterocyclic nitrogen bases which have strong and persistent nauseating odors.

All of the above described amines also have a low toxicity compared to the nitrogen heterocyclic bases such as pyridine bases.

The complexes thus defined are insoluble in water and in aliphatic hydrocarbons at ordinary temperature. They are generally soluble in organic polar solvents.

These complexes can be dissolved in organic polar solvents thus permitting the introduction of the nickel into a solution which could be used for impregnating catalytic masses. In solid form they can also be used in heterogeneous catalysis.

Those complexes have also a wide field of application as clathrating agents for the selective extraction of aromatic compounds.

When used as clathrating agents, the Werner complexes hereinabove defined must not dissolve to a large extent in the aromatic compounds to be clathrated.

A preferred embodiment of this invention will also comprehend insoluble or slightly soluble complexes in aromatic hydrocarbons at work temperature.

It has been found that this solubility is bound to the number of alkyl carbon atoms in $R_1$ and $R_2$.

In order to get a satisfactory complex for clathration it is necessary to limit the number of alkyl carbon atoms in at least one of the 2 radicals $R_1$ or $R_2$ to a maximum value of 3, preferentially 1, the total number of carbon atoms of $R_1$ and $R_2$ being respectively not over 9 and 15.

Above these limits the complexes get a sticky appearance and get more and more soluble in aromatic hydrocarbons.

The use of such compounds in clathration is, of course, either impossible or unattractive.

It has been found also that steric effect might impede the formation of clathrates or even of the complex.

Such exceptions have been met for the benzylamine and also when the radical $R_1$ is not a primary one, by example in the amine:

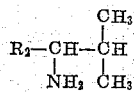

It will be noted that the same limitation is met when the amino group is not on the carbon adjacent to the benzenic radical.

The amines having no more than 3 carbon atoms in $R_1$ and 9 carbon atoms in $R_2$ are more advantageous because of the larger availability of intermediates for the synthesis of said amines.

The amines having an alkyl substituent in the meta or ortho position are less advantageous.

They are more difficult to synthesize and the complexes made with those amines react less easily in clathrating processes.

It is also to be noted that no choice is made regarding the form of the anion SCN. This formula must be taken as a whole and not restricted specifically to any of the normal or iso form.

The replacement of SCN by SeCN gives complexes having approximately the same general properties. Nevertheless these complexes are much less attractive than SCN because of their slight availability.

The clathrating activities of the complexes are not only very sensitive to the structure of the amine but also to the nature of the other components of the complex.

Experience has shown by example that cobaltous and cyano complexes with the herebefore described amines do not show the same clathrating activities as the claimed composition.

Those clathrating properties are quite unexpected if one considers that beta isomers of the hereabove described amines give non-clathrating complexes, and also that the benzylamine, the inferior homolog of the hereabove described amines gives complexes having no clathrating activities.

The new complexes themselves are quite unexpected if one considers that such complexes are not obtained with other components such as

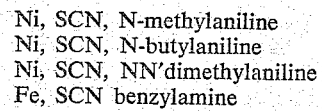

As clathrating agents they permit the extracting of certain organic compounds and the resolving of certain organic mixtures.

It has so been possible to extract methylnaphthalenes from a coal tar fraction using complexes following the invention.

Resolving of mixtures will be described with reference to specific cases as hereinafter described.

Of the cymene isomers only p-cymene may be obtained commercially in the pure form. For some applications o-cymene is suitable but was up to now very difficult to obtain in the pure form. Neither isomerization of p-cymene by aluminum chloride, nor alkylation of toluene in the presence of $AlCl_3$ gives a yield above 5% in the ortho isomer. Nevertheless, it is possible to get a yield of about 40% of the ortho isomer by reacting toluene and isopropanol in the presence of chlorosulfonic acid. As the boiling points of cymene isomers are very close (o-, 175, 1° C.; m-, 175, 6° C.; p-, 176, 9° C.) distillation cannot achieve their separation. The ortho isomer may be easily separated out of the crude mixture obtained by the last synthesis outlined above, using clathration by one of the complexes conforming to our general definition.

For clathrating such a synthesis effluent by [Ni(SCN)$_2$(alpha-phenylethylamine)$_4$] a solution of 0.0784 mole of alpha-phenylethylamine in 30 ml. of the mixture of cymenes (in mole percent: o-, 41; m-, 21; p-, 38) is slowly added, while stirring at room temperature, to an aqueous solution obtained by dissolving 0.0185 mole of NiCl$_2$.6H$_2$O and 0.0370 mole of KSCN in 20 ml. distilled water. After stirring for 15 minutes, the resulting precipitate is then separated by filtration, washed three times in 50 ml. of pentane and dried in air. 10 g. of the dry precipitate are decomposed by 40 ml. of 6 N HCl.

The supernatant organic phase is recovered and analyzed by infra-red spectroscopy. It is thus found that 10.8% of the solid obtained are essentially o-cymene (in mole percent: o-, 92; m-, 7; p-, 1). The remainder is formed essentially by the complex [Ni(SCN)$_2$(amine)$_4$] as shown by analysis of each constituent.

For clathrating a mixture of p-cymene and methylnaphthalene by [Ni(SCN)$_2$(alpha-phenylbutylamine)$_4$], a solution of 0.0401 mole of alpha-phenylbutylamine in 25 ml. of an equimolar mixture of p-cymene and commercial methyl-naphthalene (Grade No. 1 A.S.T.M. alpha-methylnaphthalene) is added, while stirring at room temperature to an aqueous solution obtained by dissolving 0.0093 mole of NiCl$_2$.6H$_2$O and 0.0185 mole of KSCN in 10 ml. of distilled water. After stirring for 15 minutes, the resulting precipitate is then separated by filtration, washed three times in 30 ml. of pentane and dried in air. 5 gr. of the dry precipitate are decomposed by 10 ml. of 6 N HCl.

The supernatant organic phase is recovered and analyzed by vapor phase chromatography. It is thus found that 9.1% of the solid obtained are essentially methyl-naphthalene (methylnaphthalene, 98 mole percent; p-cymene, 2 mole percent). The remainder is formed essentially by the complex [Ni(SCN)$_2$(amine)$_4$].

For clathrating a mixture of p-xylene and p-cymene by [Ni(SCN)$_2${alpha-(ortho-tolyl)ethylamine}$_4$], a solution of 0.0281 mole of alpha-(ortho-tolyl)ethylamine in 17 ml. of an equimolar mixture of p-xylene and p-cymene is slowly added, while stirring at the ice bath temperature, to an aqueous solution obtained by dissolving 0.0062 mole of NiCl$_2$.6H$_2$O and 0.0124 mole of KSCN in 7 ml. of distilled water. After stirring for 15 minutes, the resulting precipitate is then separated by filtration, washed twice at the ice bath temperature by 20 ml. of pentane and dried in air. 4 gr. of the dry precipitate are decomposed by 10 ml. of 6 N HCl. The supernatant organic phase is extracted by 2 ml. of heptane and analyzed by vapor phase chromatography. It is thus found that 8.9% of the solid obtained are essentially p-xylene (p-xylene, 94 mole percent; p-cymene, 6 mole percent). The remainder is formed essentially by the complex

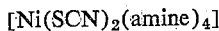

[Ni(SCN)$_2$(amine)$_4$]

For clathrating a mixture of o-xylene and methyl-naphthalene by [Ni(SCN)$_2${alpha-(metatolyl)ethylamine}$_4$], a solution of 0.0443 mole of alpha-(meta-tolyl)ethylamine in 25 ml. of an equimolar mixture of o-xylene and commercial methylnaphthalene (Grade No. 1 A.S.T.M. alpha-methylnaphthalene) is slowly added, while stirring at the ice bath temperature, to an aqueous solution obtained by dissolving 0.0093 mole of NiCl$_2$.6H$_2$O and 0.0185 mole of KSCN in 10 ml. of distilled water. After stirring for 20 minutes, the resulting precipitate is then separated by filtration, washed three times at the ice bath temperature by 50 ml. of pentane and dried in air. 5 gr. of the dry precipitate are decomposed by 10 ml. of 6 N.HCl. The supernatant organic phase is extracted by 3 ml. of p-cymene and analyzed by vapor phase chromatography. It is thus found that 14.5% of the solid obtained are aromatic hydrocarbons (methylnaphthalene, 88 mole percent; o-xylene, 12 mole percent). The remainder is formed essentially by the complex

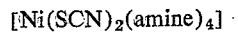

[Ni(SCN)$_2$(amine)$_4$]

For clathrating a mixture of p-cymene and methyl-naphthalene by [Ni(SCN)$_2${alpha-(para-tolyl)-ethylamine}$_4$], a solution of 0.0386 mole of alpha-(para-tolyl)-ethylamine in 25 ml. of an equimolar mixture of p-cymene and commercial methylnaphthalene (Grade No. 1 A.S.T.M. alpha-methylnaphthalene) is slowly added, while stirring at room temperature, to an aqueous solution obtained by dissolving 0.0093 mole of NiCl$_2$.6H$_2$O and 0.0185 mole of KSCN in 10 ml. of distilled water. After stirring for 15 minutes, the resulting precipitate is separated by filtration, washed three times in 30 ml. of pentane and dried in air. 5 gr. of the dry precipitate are decomposed by 10 ml. of 6 N HCl. The supernatant organic phase is recovered and analyzed by vapor phase chromatography. It is thus found that 13.1% of the solid obtained are essentially methylnaphthalene (methylnaphthalene, 93 mole percent; p-cymene, 7 mole percent). The remainder is essentially the complex

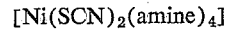

[Ni(SCN)$_2$(amine)$_4$]

Crude mixtures of monomethylnaphthalenes are obtained by distillation of coal tar or from an aromatic petroleum fraction. Mixtures of monomethylnaphthalenes are used as such, e.g., as reference fuel in the A.S.T.M. method. For some other uses, like further synthesis, one may want one of the two isomers in the pure form. The β-isomer is obtained in a pure form by freezing it out of the mixture. The α-isomer is more difficult to get in the pure form. Clathration of such a mixture by one of the complexes conforming to our general definition leads to the separation of the α-isomer.

For clathrating an isomer mixture of methylnaphthalenes by [Ni(SCN)$_2${alpha-(para-cumyl)-ethylamine}$_4$], a solution of 0.0425 mole of alpha-(para-cumyl)-ethylamine in 25 ml. of a commercial methylnaphthalene (Grade No. 1 A.S.T.M. alpha-methylnaphthalene containing 52% of the α-isomer, 42% of the β-isomer and 6% indole) is slowly added, while stirring at the ice bath temperature, to an aqueous solution obtained by dissolving 0.0093 mole of NiCl$_2$.6H$_2$O and 0.0185 mole of KSCN in 10 ml. of distilled water. After stirring for 30 minutes, 75 ml. iced pentane are added for speeding the crystallization of the complex. The resulting precipitate is separated by filtration, washed three times in 30 ml. of pentane and dried in air. 5 g. of the dry precipitate are decomposed by 10 ml. of 6 N HCl. The supernatant organic phase is extracted in 3 ml. of p-cymene, and analyzed by vapor phase chromatography. It is thus found that 18.7% of the solid obtained is chiefly alpha-methylnaphthalene (α-isomer, 83%; β-isomer, 17%). The remainder is essentially the complex

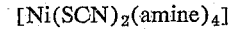

[Ni(SCN)$_2$(amine)$_4$]

In another set of experiments, this commercial methyl-naphthalene has been acid washed in order to eliminate the indole.

The treated product containing 55% by weight of the alpha isomer and 45% by weight of the beta isomer has been treated in a similar manner with different complexes.

The obtained results are given in Table I.

Table I.—Clathration of methylnaphthalenes using complexes of the type

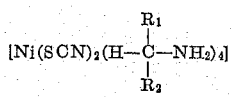

$[Ni(SCN)_2(H-\underset{R_2}{\overset{R_1}{C}}-NH_2)_4]$

| No. | Amine R₁ | Amine R₂ | Composition of methylnaphthalenes in weight percent in the clathrate Feed: α=55 β=45 | | $C_p$* | Selectivity |
|---|---|---|---|---|---|---|
| | | | α | β | | |
| 1 | H | p-CH₃—C₆H₄ | 84 | 16 | 14.1 | α |
| 2 | CH₃ | C₆H₅ | 71 | 29 | 22.2 | α |
| 3 | C₂H₅ | C₆H₅ | 23 | 77 | 26.5 | β |
| 4 | C₃H₇ | C₆H₅ | 24 | 76 | 16.3 | β |
| 5 | C₄H₉ | C₆H₅ | 56 | 44 | 13.2 | α |
| 6 | i-C₄H₉ | C₆H₅ | 65 | 35 | 20.2 | α |
| 7 | C₅H₁₁ | C₆H₅ | 17 | 83 | 13.1 | β |
| 8 | i-C₅H₁₁ | C₆H₅ | 31 | 69 | 13.0 | β |
| 9 | C₆H₁₃ | C₆H₅ | 71 | 29 | 6.9 | α |
| 10 | CH₃ | m-CH₃—C₆H₄ | 64 | 36 | 20.0 | α |
| 11 | CH₃ | p-CH₃—C₆H₄ | 73 | 27 | 19.6 | α |
| 12 | CH₃ | p-C₂H₅—C₆H₄ | 82 | 18 | 16.5 | α |
| 13 | CH₃ | p-t.C₄H₉—C₆H₄ | 83 | 17 | 25.1 | α |
| 14 | C₃H₇ | p-CH₃—C₆H₄ | 63 | 37 | 19.6 | α |
| 15 | C₆H₁₃ | p-CH₃—C₆H₄ | 71 | 19 | 6.9 | α |

$C_p$* = Weight of clathrated methylnaphthalenes/Weight of clathrate × 100.

For separating a mixture of xylenes, a solution of 14.67 gr. (82.7 mM., that is to say a 12% excess over the stoichiometric quantity) of alpha-phenylisohexylamine in 50 ml. of an equimolar mixture of the three xylenes is slowly added, while stirring at the ice bath temperature, to an aqueous solution obtained by dissolving 4.40 gr. (18.50 mM.) of NiCl₂.6H₂O and 3.70 gr. (38.10 mM.) of KSCN in 10 ml. of distilled water. After stirring for 20 minutes, the precipitate which is obtained is filtered off and washed twice: the first time by stirring in 70 ml. of heptane and the second time in 70 ml. of pentane. The precipitate is finally filtered off again and dried in a thin layer at room pressure and temperature for 30 minutes.

The resulting clathrate is a blue powder composed of xylene and of the complex conforming to the general formula [Ni(NCS)₂(amine)₄] as shown by the analysis: the molar ratio amine/NCS=2.02 and the molar ratio amine/Ni=3.99 are very close to the theoretical values 2 and 4. For analyzing the clathrated xylenes, 5 g. of the dry clathrate are decomposed by 40 ml. of 20% H₂SO₄. The supernatant organic phase is recovered and analyzed by infra-red spectroscopy.

Similar tests made with complexes of other amines have given the results mentioned in Table II.

Table II.—Clathration of xylenes using complexes of the type $[Ni(SCN)_2\{H-\underset{R_2}{\overset{R_1}{C}}-NH_2\}_4]$

| No. | Amine R₁ | Amine R₂ | Composition of Xylene (Weight Percent) in— | | | | | | $C_p$* | Selectivity |
|---|---|---|---|---|---|---|---|---|---|---|
| | | | Feed | | | Clathrate | | | | |
| | | | o | m | p | o | m | p | | |
| 1 | CH₃ | C₆H₅ | 37 | 31 | 32 | 62 | 19 | 19 | 18.2 | o |
| 2 | C₂H₅ | C₆H₅ | 37 | 31 | 32 | 12 | 26 | 92 | 17.8 | p |
| 3 | C₃H₇ | C₆H₅ | 37 | 31 | 32 | 23 | 7 | 70 | 11.3 | p |
| 4 | C₄H₉ | C₆H₅ | 34 | 31 | 35 | 84 | 13 | 3 | 10.8 | o |
| 5 | i-C₄H₉ | C₆H₅ | 34 | 32 | 34 | 72 | 20 | 8 | 17.5 | o |
| 6 | C₅H₁₁ | C₆H₅ | 34 | 32 | 34 | 5 | 71 | 24 | 8.9 | m |
| 7 | i-C₅H₁₁ | C₆H₅ | 35 | 31 | 34 | 13 | 76 | 11 | 9.8 | m |
| 8 | C₆H₁₃ | C₆H₅ | 34 | 32 | 34 | 12 | 80 | 8 | 8.9 | m |
| 9 | C₇H₁₅ | C₆H₅ | 35 | 32 | 33 | 26 | 62 | 12 | 9.9 | m |
| 10 | C₈H₁₇ | C₆H₅ | 35 | 32 | 33 | 17 | 61 | 22 | 10.1 | m |
| 11 | C₉H₁₉ | C₆H₅ | 35 | 31 | 34 | 86 | 11 | 3 | 5.4 | o |
| 12 | C₁₇H₃₅ | C₆H₅ | 34 | 32 | 34 | 22 | 71 | 7 | 1.6 | m |
| 13 | CH₃ | o-CH₃—C₆H₄ | 0 | 48 | 52 | 0 | 10 | 90 | 6.0 | p |
| | | | 50 | 0 | 50 | 17 | 0 | 83 | 4.1 | |
| 14 | CH₃ | p-CH₃—C₆H₄ | 34 | 30 | 36 | 60 | 11 | 29 | 13.8 | o |
| 15 | CH₃ | p-C₂H₅—C₆H₄ | 37 | 31 | 32 | 78 | 18 | 4 | 9.3 | o |
| 16 | CH₃ | p-(CH₃)₂CH—C₆H₄ | 37 | 31 | 32 | 89 | 8 | 3 | 12.3 | o |
| 17 | CH₃ | p-(CH₃)₃C—C₆H₄ | 37 | 31 | 32 | 83 | 13 | 4 | 6.8 | o |
| 18 | CH₃ | p-C₉H₁₉—C₆H₄ | 34 | 32 | 34 | 9 | 31 | 60 | 5.5 | p |
| 19 | C₃H₇ | p-CH₃—C₆H₄ | 34 | 32 | 34 | 58 | 31 | 11 | 8.9 | o |
| 20 | C₆H₁₃ | p-CH₃—C₆H₄ | 34 | 32 | 34 | 33 | 56 | 11 | 8.3 | m |

$C_p$* = Weight of clathrated xylenes/Weight of clathrate × 100.

The preparation of the complexes according to the invention is advantageously carried out in taking as the source of nickel and SCN two different salts containing these ions and which would be easier to obtain. In this case double decomposition occurs: the less soluble complex being obtained by displacement of the equilibrium. For example:

$NiCl_2 + 2KCNS + 4X (X=amine) \rightarrow Ni(SCN)_2X_4 + 2KCl$

It has, on the other hand, been found that the complexes prepared in aqueous medium always contain more or less large quantities of hydroxide of the base metal which is thus deprived of its active function.

In order to avoid this formation of hydroxide it is obviously possible to operate in the absence of water, for example by causing the amine to react, in vapor form with, the solid salt.

Such procedure is obviously slower and more difficult to carry out than the liquid phase procedure referred to above.

It has been found possible to combine the advantages of working in liquid phase and the elimination of nickel hydroxide formation in adding to the aqueous phase a non-aromatic hydrocarbon in quantity sufficient to impregnate the complex (which itself is lipophilic), for example by using a solvent quantity of 1/1 by weight with respect to the complex to be formed.

In this way there are obtained complexes almost free of nickel hydroxide. Surprisingly this process has also beneficial effect on the crystallization velocity and the ease of settling.

The hydrocarbon is chosen so as not to interfere with the operational process and so as to be easily removed after the complex is prepared.

The following examples illustrate what has been said above for the compositions of the complexes as well as their preparation and their properties.

EXAMPLE 1.—PREPARATION OF [Ni(NCS)$_2$($\alpha$-PHENYLAMYLAMINE)$_4$]

A solution of 13.50 gr. (82.70 mM., that is to say a 12% excess over the stoichiometric quantity) of $\alpha$-phenylamylamine in 10 ml. of heptane is slowly added, while stirring at room temperature, to a binary mixture comprising 10 ml. of heptane and an aqueous solution obtained by dissolving 4.40 gr. (18.50 mM.) of NiCl$_2$.6H$_2$O and 3.70 gr. (38.10 mM.) of KSCN in 10 ml. of distilled water. After stirring for 20 minutes, the precipitate which is obtained is filtered off and washed by stirring in a mixture of 20 ml. of heptane and 10 ml. of water. This washing removes any remaining salt or unreacted amine. This precipitate is filtered off again and dried in a thin layer under vacuum at room temperature for two hours. The resulting complex is a blue powder conforming to the formula [Ni(NCS)$_2$(amine)$_4$] as shown by the analysis (see Table II).

EXAMPLE 2.—PREPARATION OF [Ni(SCN)$_2$($\alpha$-PHENYLNONYLAMINE)$_4$]

16.23 gr. (74.0 mM.) of $\alpha$-phenylnonylamine are slowly added, while stirring at the ice bath temperature, to an aqueous solution obtained by dissolving 4.40 gr. (18.50 mM.) of NiCl$_2$.6H$_2$O and 3.70 gr. (38.10 mM.) of KSCN in 30 ml. of distilled water. After stirring for 30 minutes, the precipitate which is obtained is filtered off and washed by stirring in 50 ml. of distilled water. The precipitate is filtered off again and dried in a thin layer under vacuum at room temperature for two hours. The resulting complex is a blue powder conforming to the formula [Ni(NCS)$_2$(amine)$_4$] as shown by the analysis (see Table II).

EXAMPLE 3.—PREPARATION OF [Ni(NCS)$_2$($\alpha$-PHENYLOCTADECYLAMINE)$_4$]

25.57 gr. 74.0 mM.) of $\alpha$-phenyloctadecylamine are slowly added, while stirring at room temperature, to an aqueous solution obtained by dissolving 3.23 gr. (18.5 mM.) of Ni(NCS)$_2$ in 40 ml. of distilled water. After stirring for 30 minutes, the precipitate which is obtained is filtered off and dried in a thin layer under vacuum at room temperature for two hours. The resulting complex is a blue powder conforming to the formula

[Ni(NCS)$_2$(amine)$_4$]

as shown by the analysis (see Table III).

EXAMPLE 4.—PREPARATION OF [Ni(NCS)$_2${($\alpha$-(p-TER-BUTYLPHENYL)ETHYLAMINE}$_4$]

13.12 gr. (74.0 mM.) of $\alpha$-(p-ter-butylphenyl)ethylamine are slowly added at the ice bath temperature to an aqueous solution obtained by dissolving 4.40 gr. (18.5 mM.) of NiCl$_2$.6H$_2$O and 3.70 gr. of KSCN in 30 ml. of distilled water. When stirring for 30 minutes, 3 ml. of heptane are added for improving the crystallization of the complex; then the precipitate is filtered off and washed by stirring in 50 ml. of distilled water. The precipitate is filtered off again and dried in a thin layer under vacuum for two hours. The resulting complex is a blue powder conforming to the formula [Ni(NCS)$_2$(amine)$_4$] as shown by the analysis (see Table III).

EXAMPLE 5.—PREPARATION OF [Ni(NCS)$_2${$\alpha$-(p-NONYLPHENYL)-ETHYLAMINE}$_4$]

18.31 gr. (74.0 mM.) of $\alpha$-(p-nonylphenyl)ethylamine are slowly added, while stirring at the ice bath temperature, to an aqueous solution obtained by dissolving 4.40 gr. (18.50 mM.) of NiCl$_2$.6H$_2$O and 3.70 gr. (38.10 mM.) of KSCN in 40 ml. of distilled water. After stirring for 30 minutes, the precipitate which is obtained is filtered off and washed by stirring in 125 ml. of distilled water. The precipitate which is obtained is filtered off again and dried in a thin layer under vacuum at room temperature for 15 hours. The resulting complex is a blue powder conforming to the formula [Ni(NCS)$_2$(amine)$_4$] as shown by the analysis (see Table III).

EXAMPLE 6.—PREPARATION OF [Ni(NCS)$_2${$\alpha$-(p-TOLYL)HEPTYLAMINE}$_4$]

15.20 gr. (74.0 mM.) of $\alpha$-(p-tolyl)heptylamine are slowly added, while stirring at the ice bath temperature to an aqueous solution obtained by dissolving 4.40 gr. (18.5 mM.) of NiCl$_2$.6H$_2$O and 3.70 gr. (38.10 mM.) of KSCN in 40 ml. of distilled water. After stirring for 20 minutes, the precipitate which is obtained is filtered off and washed by stirring in 70 ml. of distilled water. The precipitate is filtered off again and dried in a thin layer under vacuum at room temperature for 3 hours. The resulting complex is a blue powder conforming to the formula

[Ni(NCS)$_2$(amine)$_4$]

as shown by the analysis (see Table III).

PREPARATION OF THE TWO-BASE COMPLEXES

The two-base complexes conforming to the formula [Ni(NCS)$_2$(amine)$_2$] are prepared by the same procedure as the corresponding four base complexes except for the following differences:

(1) Two molar equivalents of amine are added instead of four;
(2) The resulting complexes are washed a second time by stirring in a chlorinated aliphatic hydrocarbon (i.e. CHCl$_3$, CH$_2$Cl$_2$). The result of this washing is to eliminate any four-base complex which would be formed;
(3) The two-base complexes are more easily formed when a chlorinated aliphatic hydrocarbon is present during their formation, and the amine is best diluted with such a product. An example will make this more clearly understood.

EXAMPLE 7.—PREPARATION OF [Ni(NCS)$_2${$\alpha$-(p-TER-BUTYLPHENYL)ETHYLAMINE}$_2$]

A solution of 6.55 gr. (37.0 mM.) of $\alpha$-(p-ter-butylphenyl)ethylamine in 5 ml. of chloroform is slowly added, while stirring at the ice bath temperature, to a binary mixture comprising 25 ml. of heptane and an aqueous solution obtained by dissolving 4.40 gr. (18.5 mM.) of NiCl$_2$.6H$_2$O and 3.70 gr. (38.10 mM.) of KSCN in 10 ml. of distilled water.

After stirring for 30 minutes, the precipitate which is obtained is filtered off and washed twice: the first time by stirring in a mixture of 30 ml. of heptane and 10 ml. of distilled water and the second time in 60 ml. of chloroform. The precipitate is finally filtered off again and dried in a thin layer under vacuum at 45° C. for 2 hours. The resulting complex is a green powder conforming to the formula [Ni(NCS)$_2$(amine)$_2$] as shown by the analysis (see Table III).

The color and the ratio X/NCS–X/Ni of series of complexes prepared following the process indicated in the preceding examples as given in Table III.

*Table III*

| No. | Complex | Color | Molar X/NCS | Ratios X/Ni |
|---|---|---|---|---|
| 1 | [Ni(NCS)$_2$(p-methylbenzylamine)$_4$] | Purple, blue | 2.01 | 3.87 |
| 2 | [Ni(NCS)$_2$(α-phenylethylamine)$_4$] | Blue | 2.01 | 3.97 |
| 3 | [Ni(NCS)$_2$(α-phenylethylamine)$_2$] | Pale green | 0.99 | 1.95 |
| 4 | [Ni(NCS)$_2$(α-phenylpropylamine)$_4$] | Blue | 1.96 | 3.95 |
| 5 | [Ni(NCS)$_2$(α-phenylpropylamine)$_2$] | Pale green | 1.00 | 1.99 |
| 6 | [Ni(NCS)$_2$(α-phenylbutylamine)$_4$] | Blue | 1.97 | 3.94 |
| 7 | [Ni(NCS)$_2$(α-phenylbutylamine)$_2$] | Green | 0.96 | 1.89 |
| 8 | [Ni(NCS)$_2$(α-phenylamylamine)$_4$] | Blue | 2.01 | 3.97 |
| 9 | [Ni(NCS)$_2$(α-phenylamylamine)$_2$] | Pale green | 1.00 | 1.99 |
| 10 | [Ni(NCS)$_2$(α-phenylisoamylamine)$_4$] | Blue | 2.01 | 3.90 |
| 11 | [Ni(NCS)$_2$(α-phenylisoamylamine)$_2$] | Green | 1.00 | 1.98 |
| 12 | [Ni(NCS)$_2$(α-phenylhexylamine)$_4$] | Blue | 1.99 | 3.85 |
| 13 | [Ni(NCS)$_2$(α-phenylhexylamine)$_2$] | Green | 0.99 | 1.95 |
| 14 | [Ni(NCS)$_2$(α-phenylisohexylamine)$_4$] | Blue | 2.01 | 3.97 |
| 15 | [Ni(NCS)$_2$(α-phenylheptylamine)$_4$] | do | 1.98 | 3.57 |
| 16 | [Ni(NCS)$_2$(α-phenylheptylamine)$_2$] | Green | 0.98 | 1.92 |
| 17 | [Ni(NCS)$_2$(α-phenyloctylamine)$_4$] | Blue | 2.10 | 4.11 |
| 18 | [Ni(NCS)$_2$(α-phenyloctylamine)$_2$] | Green | 1.07 | 2.09 |
| 19 | [Ni(NCS)$_2$(α-phenylnonylamine)$_4$] | Blue | 2.03 | 3.97 |
| 20 | [Ni(NCS)$_2$(α-phenylnonylamine)$_2$] | Green | 1.02 | 2.02 |
| 21 | [Ni(NCS)$_2$(α-phenyldecylamine)$_4$] | Blue | 2.02 | 3.88 |
| 22 | [Ni(NCS)$_2$(α-phenyloctadecylamine)$_4$] | do | 2.27 | 4.42 |
| 23 | [Ni(NCS)$_2${α-(o-tolyl)ethylamine}$_4$] | do | 2.11 | 4.21 |
| 24 | [Ni(NCS)$_2${α-(m-tolyl)ethylamine}$_4$] | do | 2.06 | 3.96 |
| 25 | [Ni(NCS)$_2${α-(m-tolyl)ethylamine}$_2$] | Pale green | 0.99 | 1.89 |
| 26 | [Ni(NCS)$_2${α-(p-tolyl)ethylamine}$_4$] | Blue | 1.93 | 3.84 |
| 27 | [Ni(NCS)$_2${α-(p-tolyl)ethylamine}$_2$] | Pale green | 0.99 | 1.94 |
| 28 | [Ni(NCS)$_2${α-(p-ethylphenyl)ethylamine}$_4$] | Blue | 1.97 | 3.91 |
| 29 | [Ni(NCS)$_2${α-(p-cumyl)ethylamine}$_4$] | do | 1.94 | 3.82 |
| 30 | [Ni(NCS)$_2${α-(p-cumyl)ethylamine}$_2$] | Pale green | 1.01 | 1.96 |
| 31 | [Ni(NCS)$_2${α-(p-ter-butylphenyl)ethylamine}$_4$] | Blue | 2.02 | 3.89 |
| 32 | [Ni(NCS)$_2${α-(p-ter-butylphenyl)ethylamine}$_2$] | Pale green | 0.98 | 1.94 |
| 33 | [Ni(NCS)$_2${α-(p-nonylphenyl)ethylamine}$_4$] | Blue | 2.16 | 4.23 |
| 34 | [Ni(NCS)$_2${α-(p-tolyl)butylamine}$_4$] | do | 2.25 | 4.39 |
| 35 | [Ni(NCS)$_2${α-(p-cumyl)butylamine}$_4$] | do | 2.06 | 3.98 |
| 36 | [Ni(NCS)$_2${α-(p-tolyl)heptylamine}$_4$] | do | 1.93 | 3.91 |
| 37 | [Ni(NCS)$_2${α-(p-tolyl)heptylamine}$_2$] | Pale green | 1.02 | 2.03 |
| 38 | [Ni(NCS)$_2${α-(p-nonylphenyl)butylamine}$_2$] | do | 0.98 | 1.92 |
| 39 | [Ni(NCS)$_2${α-(p-nonylphenyl)butylamine}$_4$] | Blue | 2.24 | 4.41 |
| 40 | [Ni(NCS)$_2${α-(p-propylphenyl)nonylamine}$_2$] | Pale green | 0.97 | 1.89 |
| 41 | [Ni(NCS)$_2${α-(p-propylphenyl)nonylamine}$_4$] | Blue | 2.16 | 4.22 |

POLYSUBSTITUTED PHENYLALKYLAMINES

According to this aspect of the invention, there is provided a Werner complex of the general formula $$Ni(SCN)_2X_n$$

which is insoluble or sparingly soluble in water at room temperature wherein X is an alpha-arylalkylamine having the general formula:

where $R_1$ is either hydrogen or a primary alkyl group and $R_2$ is a phenyl group substituted by 2 to 3 alkyl groups at the 3, 4, 5 positions; $n$ is either 2 or 4.

The number of carbon atoms of the principal alkyl group may vary within rather broad limits. Nevertheless a probability of getting steric effect impeding the formation of the complex will be met with the higher alkyl groups, also the solubility and the physical aspect of the complex depend on the length of the chain $R_1$ and the complex will get less and less insoluble in hydrocarbons and more and more waxy as the length of the chain $R_1$ increases.

When used as clathrating agents, the Werner complexes here defined must remain solid and not dissolve to a large extent in aromatic compounds to be clathrated. A preferred embodiment of this invention will so comprehend insoluble or slightly soluble complexes in aromatic hydrocarbons at room temperature.

It is thus preferred that there be 1 to about 6 carbon atoms in the $R_1$ alkyl group, even more preferably 1 to 3 carbon atoms.

For similar reasons the preferred alkyl substituents of $R_2$ will be either methyl or ethyl groups, that is to say the alkyl substituents of the phenyl radical preferably have not more than 2 carbon atoms.

All substituents of $R_2$ will also be conveniently identical in one compound.

Substitution in 2 or 6 position is less suitable for forming complexes where $n$ is 4. Such complexes when they are obtained are also less active clathrating agents.

Most preferably there will be 2 methyl substituents in positions 3 and 4.

Specific but not limitative examples of the hereinbefore described class of aminated bases are:

| | B.P., °C./mm. | M.P. (HCL salt), °C. | $n_D^{20}$ |
|---|---|---|---|
| α-(3,4-dimethylphenyl)ethylamine | 100–2°/10 | 178–9 | 1.5258 |

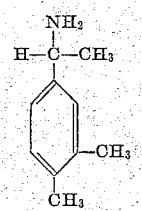

| | B.P., °C./mm. | M.P. (HCL salt), °C. | $n_D^{20}$ |
|---|---|---|---|
| α-(3,4-dimethylphenyl)butylamine 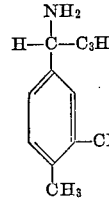 | 135-6°/15 | 271-2 | 1.5156 |
| α-(3,4-dimethylphenyl)heptylamine 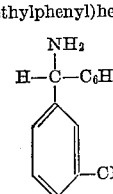 | 173-5°/15 | 218-20 | 1.5081 |
| α-(3,5-dimethylphenyl)ethylamine 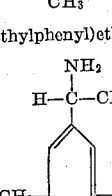 | 97-9°/10 | 243-4 | 1.5205 |
| α-(3,4,5-trimethylphenyl)ethylamine 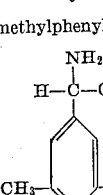 | 120-3°/12 | 225-6 | 1.5295 |
| α-(3,4,5-trimethylphenyl)propylamine 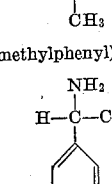 | 140-2°/14 | 251-3 | 1.5255 |
| α-(3,4,5-triethylphenyl)ethylamine 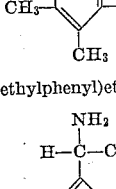 | 130-5°/5 | 213-15 | 1.5201 |

All amines hereabove described have little or no ammoniacal odor, thus differing markedly from heterocyclic nitrogen bases, which exhibit strong and persistent nauseous smelling. In addition, all amines hereinbefore described have a very low vapor pressure, thus reducing fire risks.

All amines hereinabove described are also new chemical compounds. They are easily prepared by reductive amination of the corresponding ketones, by example by heating the ketone with ammonium formate (Leuckart reaction).

It is to be noted that no choice is made regarding the form of the anion SCN. The formula SCN must be taken as a whole and not be restricted specifically to any of the normal or iso forms. Replacement of SCN by SeCN gives also complexes having approximately the same general properties. Nevertheless these complexes are much less attractive because they are not readily available as compared to the SCN complexes.

The complexes have numerous uses: they can be dissolved in organic polar solvents, thus permitting the introduction of nickel into these solutions, in which it can act as oxidation or polymerization catalyst. They can also be used in solution for impregnating catalytic masses.

In solid form they can be used as heterogenous catalyst or as clathrating agent.

As clathrating agents, they permit resolution of mixtures which are difficult to resolve by conventional methods, particularly mixtures of aromatic isomers.

In such uses they show unexpected properties. By example, for the separation of polar substituted aromatic compounds. As is shown by the specific examples given hereafter, the complexes exhibit high selectivities and good capacities towards aromatic molecules carrying at least one polar group such as an halogen, a nitro, a cyano, or even a hydroxyl group. Such compounds were either difficult or impossible to separate with previously described complexes of the Werner type. They form therefore a convenient means for resolution of mixtures of isomers of polar aromatic compounds.

When compared with complexes of the same general formula but using other types of arylalkylamines, the complexes of this invention exhibit a marked and highly unexpected superiority in such separation processes.

The preparation of the complexes according to the invention will now be described with reference to the following non-limitative example.

EXAMPLE 8.—PREPARATION OF
[Ni(SCN)$_2${α-(3,4-DIMETHYLPHENYL)ETHYLAMINE}$_4$]

A solution of 0.0250 mole of α-(3,4-dimethylphenyl) ethylamine in 6 ml. of heptane is slowly added, while stirring at room temperature, to an aqueous solution obtained by dissolving 0.0056 mole of NiCl$_2$·6H$_2$O and 0.014 mole of KSCN in 6 ml. of distilled water. After stirring for 30 minutes, the resulting precipitate is then separated by filtration, washed with a mixture of 6 ml. of heptane and 6 ml. of water and dried for 2 hours under vacuum at room temperature.

The composition of the resulting 4-base complex is shown in Table IV.

The other complexes in accordance with the invention are prepared in a similar manner.

The two-base complexes are obtained by using stoichiometric quantities of reactants, i.e., $2x$ moles of amine, $x$ moles of NiCl$_2$·6H$_2$O, $2x$ moles of KCNS, a slight deficit of amine being advisable. Furthermore, the 2-base complexes are easier to obtain in a pure form when an equal quantity of chloroform is added to heptane either for the formation and for the washing of the complex; those complexes are then dried for 2 hours under vacuum at 100° C.

For complexes conforming to the general formula Ni(SCN)$_2$X$_n$, the theoretical values of the molar ratio SCN/Ni and X/Ni are respectively 2 and 4 when $n$ is 4, and 2 when $n$ is 2.

For the complexes hereinabove described, we have found, by functional analysis, ratios very close to the theoretical values leaving no doubt about the composition of the complexes.

The solubility of the new complexes in methanol has been determined. This solubility may be increased by adding to the methanol some of the corresponding amine.

Table IV

| Complexes | Color | Molar ratios X/Ni | Molar ratios SCN/Ni | Solubility in Methanol |
|---|---|---|---|---|
| [Ni(SCN)$_2${α-(3,4-dimethylphenyl)ethylamine}$_4$]. | Blue | 4.34 | 2.00 | Very soluble. |
| [Ni(SCN)$_2${α-(3,4-dimethylphenyl)butylamine}$_4$]. | Pale blue | 3.96 | 1.96 | Soluble. |
| [Ni(SCN)$_2${α-(3,4-dimethylphenyl)heptylamine}$_4$]. | do | 3.98 | 1.97 | Very soluble. |
| [Ni(SCN)$_2${α-(3,5-dimethylphenyl)ethylamine}$_4$]. | do | 3.96 | 1.99 | Slightly soluble. |
| [Ni(SCN)$_2${α-(3,4,5-trimethylphenyl)ethylamine}$_4$]. | do | 4.25 | 2.01 | Very slightly soluble. |
| [Ni(SCN)$_2${α-(3,4,5-triethylphenyl)ethylamine}$_4$]. | Blue | 3.96 | 1.96 | Soluble. |
| [Ni(SCN)$_2${α-(3,4,5-trimethylphenyl)propylamine}$_4$]. | do | 4.02 | 1.94 | Slightly soluble. |
| [Ni(SCN)$_2${α-(3,4-dimethylphenyl)ethylamine}$_2$]. | Green | 1.92 | 1.95 | Do. |
| [Ni(SCN)$_2${α-(3,4,5-trimethylphenyl)ethylamine}$_2$]. | Pale green | 2.07 | 2.04 | Very slightly soluble. |
| [Ni(SCN)$_2${α-(3,4-dimethylphenyl)heptylamine}$_2$]. | Green | 2.09 | 2.02 | Soluble. |

The new complexes are particularly useful as clathrating agents for the extraction or the separation of isomers of aromatic molecules. In such process they prove to be particularly effective for extraction or refining of polar aromatic compounds.

Such molecules which may be extracted or resolved into their isomers by clathration with the new complexes are for instance:

Benzotrifluoride  Trichlorobenzenes
Nitrobenzene  Cresols
Nitrotoluenes  Benzonitrile
Dichlorobenzenes This list is by no means limitative and many other aromatics such as xylenes and methylnaphthalenes are also clathrated.

Complete recovery by crystallization of one isomer out of a crude mixture is often limited by the formation of an eutectic or by the precipitation of mixed crystals: clathration often permits a much better recovery of the product beyond those concentration limits. For instance, separation of dichlorobenzene isomers by clathration with the new Werner complexes will be described with reference to the following specific case.

For clathrating a mixture of dichlorobenzenes (in mole percent o-: 33; m-: 33; p-: 34) by [Ni(SCN)$_2${α-(3,4-dimethylphenyl)ethylamine}$_4$] a solution of 0.0250 mole of α-(3,4-dimethylphenyl)ethylamine in 12 ml. of a mixture comprising 9 ml. of dichlorobenzenes and 3 ml. of heptane is slowly added, while stirring at the ice bath temperature, to an aqueous solution obtained by dissolving 0.0056 mole of NiCl$_2$.6H$_2$O and 0.0114 mole of KSCN in 6 ml. of distilled water. After stirring for 30 minutes, the resulting precipitate is then separated by filtration, washed once with 20 ml. of heptane and once with 20 ml. of pentane and then dried in air.

3 g. of the dry precipitate are decomposed by 10 ml. of 20% sulfuric acid. After decomposition, the sulfuric acid is diluted by 20 ml. of distilled water and the clathrated dichlorobenzenes are extracted by 10 ml. of cyclohexane and analyzed by spectrophotometry. It is thus found that 15.7% of the solid obtained consists of dichlorobenzene isomers with a strong enrichment of the para-isomer (in mole percent: o-, 3; m-, 4; p-, 93).

The remainder consists essentially of the complex [Ni(SCN)$_2$(amine)$_4$].

Other resolutions of mixtures of aromatic compounds are realized by the same procedure employing the same complex or the other complexes according to the invention; the results of such clathrations are summarized together with the preceding results in Table V.

Table V

| Aminated base of the 4-base complex | Composition of the feed (moles percent) | Composition of the clathrated mixture (moles percent) | Clathrated compounds in the clathrate (weight percent) |
|---|---|---|---|
| α-(3,4-dimethylphenyl) ethylamine | Dichlorobenzenes: o: 33, m: 33, p: 34 | 3, 4, 93 | 15.7 |
| α-(3,5-dimethylphenyl) ethylamine | Dichlorobenzenes: o: 33, m: 33, p: 34 | 35, 33, 32 | 7.7 |
| α-(3,4,5-trimethylphenyl) ethylamine | Dichlorobenzenes: o: 33, m: 33, p: 34 | 39, 30, 31 | 5.1 |
|  | Nitrotoluenes: o: 29, m: 36, p: 35 | 35, 35, 30 | 10.1 |
|  | Toluene: 51, Benzotrifluoride: 49 | 23, 77 | 8.5 |
| α-(3,4-dimethylphenyl) butylamine | Dichlorobenzenes: o: 32, m: 34, p: 34 | 36, 23, 41 | 8.9 |
| α-(3,4,5-triethylphenyl) ethylamine | Dichlorobenzenes: o: 32, m: 34, p: 34 | 40, 28, 32 | 12.1 |
|  | Nitrotoluenes: o: 32, m: 35, p: 33 | 39, 30, 31 | 11.2 |
|  | Toluene: 52, Benzotrifluoride: 48 | 43, 57 | 6.9 |

Table V—Continued

| Aminated base of the 4-base complex | Composition of the feed (moles percent) | Composition of the clathrated mixture (moles percent) | Clathrated compounds in the clathrate (weight percent) |
|---|---|---|---|
| α-(3,4-dimethylphenyl) butylamine | Trichlorobenzenes: | | 18.4 |
| | 1,2,3: 49 | 61 | |
| | 1,2,4: 51 | 39 | |
| α-(3,4-dimethylphenyl) heptylamine | Chlorotoluenes: | | 20.3 |
| | o: 33 | 49 | |
| | m: 32 | 25 | |
| | p: 35 | 26 | |
| | Dichlorobenzenes: | | 26.1 |
| | o: 32 | 45 | |
| | m: 34 | 28 | |
| | p: 34 | 27 | |
| α-(3,4,5-trimethylphenyl) propylamine | Nitrotoluenes: | | 7.5 |
| | o: 32 | 33 | |
| | m: 36 | 35 | |
| | p: 32 | 32 | |
| | Dichlorobenzenes: | | 6.8 |
| | o: 31 | 33 | |
| | m: 34 | 33 | |
| | p: 35 | 34 | |

For additional details regarding clathration techniques, attention is invited to our application directed specifically to clathration processes using the novel complexes of this invention, said application filed simultaneously with the present application.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A Werner complex having the general formula $Ni(SCN)_2X_n$ wherein $n$ is an even number from 1 to 5, X is an alpha-arylalkylamine having the general formula—

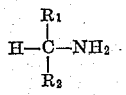

in which
$R_1$ is selected from the group consisting of hydrogen and primary alkyl radicals containing from one to nine carbon atoms,
$R_2$ is an hydrocarbon radical containing from six to fifteen carbon atoms, said radical having one benzenic ring, said benzenic ring being directly linked to the carbon atom bearing the amino group, the total number of carbon atoms of the amine being greater than seven.

2. A Werner complex having the general formula $Ni(SCN)_2X_n$ wherein $n$ is an even number from 1 to 5, X is an alpha-arylalkylamine having the general formula

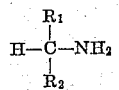

in which
$R_1$ is a primary alkyl radical containing from 1 to 9 carbon atoms,
$R_2$ is a phenyl radical.

3. A Werner complex having the general formula $Ni(SCN)_2X_n$ wherein $n$ is an even number from 1 to 5, X is an alpha-arylalkylamine having the general formula

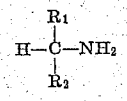

in which
$R_1$ is selected from the group consisting of hydrogen and primay alkyl groups having from 1 to 9 carbon atoms,
$R_2$ is a phenyl radical substituted by one alkyl radical having from one to 9 carbon atoms, at least one of the radicals $R_1$ and $R_2$ containing not more than 3 alkyl carbon atoms.

4. A Werner complex having the general formula $Ni(SCN)_2X_n$ wherein $n$ is an even number from 1 to 5, X is an alpha-arylalkylamine having the general formula

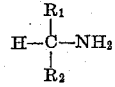

in which
$R_1$ is selected from the group consisting of hydrogen and primary alkyl groups having from 1 to 9 carbon atoms,
$R_2$ selected from the group consisting of di-alkyl and tri-alkyl-substituted phenyl radicals wherein substitution occurs at any of the 3, 4 and 5 portions of said phenyl radical, said alkyl substituents each having less than 3 carbon atoms.

5. A complex selected from the group consisting of:

[Ni(NCS)₂(p-methylbenzylamine)₄]
[Ni(NCS)₂(α-phenylethylamine)₄]
[Ni(NCS)₂(α-phenylethylamine)₂]
[Ni(NCS)₂(α-phenylpropylamine)₄]
[Ni(NCS)₂(α-phenylpropylamine)₂]
[Ni(NCS)₂(α-phenylbutylamine)₄]
[Ni(NCS)₂(α-phenylbutylamine)₂]
[Ni(NCS)₂(α-phenylamylamine)₄]
[Ni(NCS)₂(α-phenylamylamine)₂]
[Ni(NCS)₂(α-phenylisoamylamine)₄]
[Ni(NCS)₂(α-phenylisoamylamine)₂]
[Ni(NCS)₂(α-phenylhexylamine)₄]
[Ni(NCS)₂(α-phenylhexylamine)₂]
[Ni(NCS)₂(α-phenylisohexylamine)₄]
[Ni(NCS)₂(α-phenylheptylamine)₄]
[Ni(NCS)₂(α-phenylheptylamine)₂]
[Ni(NCS)₂(α-phenyloctylamine)₄]
[Ni(NCS)₂(α-phenyloctylamine)₂]
[Ni(NCS)₂(α-phenylnonylamine)₄]
[Ni(NCS)₂(α-phenylnonylamine)₂]
[Ni(NCS)₂{α-(o-tolyl)ethylamine}₄]
[Ni(NCS)₇{α-(m-tolyl)ethylamine}₄]
[Ni(NCS)₂{α-(m-tolyl)ethylamine}₂]
[Ni(NCS)₂{α-(p-tolyl)ethylamine}₄]
[Ni(NCS)₂{α-(p-tolyl)ethylamine}₂]
[Ni(NCS)₂{α-(p-ethylphenyl)ethylamine}₄]
[Ni(NCS)₂{α-(p-cumyl)ethylamine}₄]
[Ni(NCS)₂{α-(p-cumyl)ethylamine}₂]
[Ni(NCS)₂{α-(p-ter-butylphenyl)ethylamine}₄]
[Ni(NCS)₂{α-(p-ter-butylphenyl)ethylamine}₂]
[Ni(NCS)₂{α-(p-nonylphenyl)ethylamine}₄]
[Ni(NCSS)₂{α-(p-tolyl)butylamine}₄]

[Ni(NCS)$_2${α-(p-cumyl)butylamine}$_4$]
[Ni(NCS)$_2${α-(p-tolyl)heptylamine}$_4$]
[Ni(NCS)$_2${α-(p-tolyl)heptylamine}$_2$]
[Ni(NCS)$_2${α-(p-nonylphenyl)butylamine}$_2$]
[Ni(NCS)$_2${α-(p-nonylphenyl)butylamine}$_4$]
[Ni(NCS)$_2${α-(p-propylphenyl)nonylamine}$_2$]
[Ni(NCS)$_2${α-(p-propylphenyl)nonylamine}$_4$]
[Ni(SCN)$_2${α-(3,4-dimethylphenyl)ethylamine}$_4$]
[Ni(SCN)$_2${α-(3,4-dimethylphenyl)butylamine}$_4$]
[Ni(SCN)$_2${α-(3,4-dimethylphenyl)heptylamine}$_4$]
[Ni(SCN)$_2${α-(3,5-dimethylphenyl)ethylamine}$_4$]
[Ni(SCN)$_2${α-(3,4,5-trimethylphenyl)ethylamine}$_4$]
[Ni(SCN)$_2${α-(3,4,5-triethylphenyl)ethylamine}$_4$]
[Ni(SCN)$_2${α-(3,4,5-trimethylphenyl)propylamine}$_4$]
[Ni(SCN)$_2${α-(3,4-dimethylphenyl)ethylamine}$_2$]
[Ni(SCN)$_2${α-(3,4,5-trimethylphenyl)ethylamine}$_2$] and
[Ni(SCN)$_2${α-(3,4-dimethylphenyl)heptylamine}$_2$]

6. [Ni(NCS)$_2$(α-phenylethylamine)$_4$].
7. [Ni(NCS)$_2$(α-phenylpropylamine)$_4$].
8. [Ni(NCS)$_2$(α-phenylpropylamine)$_2$].
9. [Ni(NCS)$_2$(α-phenylbutylamine)$_4$].
10. [Ni(NCS)$_2$(α-phenylbutylamine)$_2$].
11. [Ni(NCS)$_2$(α-phenylamylamine)$_4$].
12. $_1$Ni(NCS)$_2$(α-phenylamylamine)$_2$].
13. [Ni(NCS)$_2$(α-phenylisoamylamine)$_4$].
14. [Ni(NCS)$_2$(α-phenylisoamylamine)$_2$].
15. [Ni(NCS)$_2$(α-phenylhexylamine)$_2$.
16. [Ni(NCS)$_2$(α-phenylisohexylamine)$_4$].
17. [Ni(NCS)$_2$(α-phenylheptylamine)$_4$].
18. [Ni(NCS)$_2$(α-phenylheptylamine)$_2$].
19. [Ni(NCS)$_2${α-(p-tolyl) ethylamine}$_4$].
20. [Ni(NCS)$_2${α-(p-tolyl)ethylamine}$_2$].
21. [Ni(NCS)$_2${α-(p-ethylphenyl)ethylamine}$_4$].
22. [Ni(NCS)$_2${α-(p-cumyl)ethylamine}$_4$].
23. [Ni(NCS)$_2${α-(p-cumyl)ethylamine}$_2$].
24. [Ni(NCS)$_2${α-(p-ter-butylphenyl)ethylamine}$_4$].
25. [Ni(NCS)$_2${α-(p-ter-butylphenyl)ethylamine}$_2$].
26. [Ni(NCS)$_2$(p-methylbenzylamine)$_4$].

References Cited by the Examiner

UNITED STATES PATENTS 2,798,103    7/57    Schaeffer et al. _____ 260—674

OTHER REFERENCES

Helvetica Chimica Acta, vol. 39, page 2107 (1956).
Sidgwick: Chemical Elements and Their Compounds, vol. II, page 1400 (1950).

TOBIAS E. LEVOW, *Primary Examiner.*